US011050807B1

(12) United States Patent
Palmer et al.

(10) Patent No.: US 11,050,807 B1
(45) Date of Patent: Jun. 29, 2021

(54) FULLY INTEGRATED VOICE OVER INTERNET PROTOCOL (VOIP), AUDIOVISUAL OVER INTERNET PROTOCOL (AVOIP), AND ARTIFICIAL INTELLIGENCE (AI) PLATFORM

(71) Applicant: Dialpad, Inc., San Francisco, CA (US)

(72) Inventors: James Palmer, Novato, CA (US); Etienne Manderscheid, San Francisco, CA (US); Kevin James, San Francisco, CA (US); Jonathan Johnston, Kitchener (CA); Nicholas Foster, Foster City, CA (US); Stefan Roesch, Blanco, TX (US)

(73) Assignee: DIALPAD, INC., San Francisco, CA (US)

( * ) Notice: Subject to any disclaimer, the term of this patent is extended or adjusted under 35 U.S.C. 154(b) by 148 days.

(21) Appl. No.: 16/414,608

(22) Filed: May 16, 2019

(51) Int. Cl.
*H04L 29/06* (2006.01)
*G10L 15/16* (2006.01)
*H04M 7/00* (2006.01)
*G06F 40/279* (2020.01)
*G10L 15/26* (2006.01)

(52) U.S. Cl.
CPC .......... *H04L 65/604* (2013.01); *G06F 40/279* (2020.01); *G10L 15/16* (2013.01); *G10L 15/26* (2013.01); *H04L 65/1046* (2013.01); *H04M 7/006* (2013.01)

(58) Field of Classification Search
CPC ... H04L 67/02; H04L 63/029; H04L 67/2838; H04L 67/2814; H04L 65/4084; H04L 67/2847; H04L 67/42; H04L 12/2803; G06F 3/167; G06F 2009/45595; G06F 7/58
See application file for complete search history.

(56) References Cited

U.S. PATENT DOCUMENTS

| 9,094,576 | B1 * | 7/2015 | Karakotsios | ........... H04N 7/157 |
| 10,074,381 | B1 * | 9/2018 | Cowburn | ................ G10L 21/10 |
| 2011/0103468 | A1 * | 5/2011 | Polisetty | ........ H04N 21/234363 375/240.03 |
| 2012/0066062 | A1 * | 3/2012 | Yoder | .................... G06Q 30/02 705/14.51 |

(Continued)

*Primary Examiner* — Michael A Keller
*Assistant Examiner* — Thao D Duong
(74) *Attorney, Agent, or Firm* — Patent Law Works LLP (57) ABSTRACT

An AI platform is fully integrated with existing VoIP/AVoIP telephony infrastructure. In the course of providing VoIP/AVoIP audiovisual calls, a VoIP/AVoIP media stream of audiovisual content is processed, and transferred between endpoints. AI processing is applied to each frame of the transferred audiovisual content, in real-time while the audiovisual call is occurring. For example, automated speech recognition can be performed on the content, in which the speech of the audiovisual content is converted to text. The audiovisual call can further be automatically transcribed to a text file in real-time. Another example is the automatic detection of the occurrence of specific triggers during calls. Additional enhanced functionality is automatically provided as a result of applying the AI processing to the transferred audiovisual content. For example, in response to detecting the occurrence of a specific trigger, a corresponding directive can be automatically output on a screen of a calling device.

19 Claims, 3 Drawing Sheets

(56) References Cited

U.S. PATENT DOCUMENTS

| | | | |
|---|---|---|---|
| 2012/0259924 A1* | 10/2012 | Patil | H04N 21/4788 709/206 |
| 2014/0157306 A1* | 6/2014 | Deo | H04N 21/44008 725/34 |
| 2017/0310716 A1* | 10/2017 | Lopez Venegas | G06Q 10/1093 |
| 2018/0352297 A1* | 12/2018 | Olet | G06K 9/00751 |
| 2019/0189117 A1* | 6/2019 | Kumar | H04L 51/02 |

* cited by examiner

Figure 3

FULLY INTEGRATED VOICE OVER INTERNET PROTOCOL (VOIP), AUDIOVISUAL OVER INTERNET PROTOCOL (AVOIP), AND ARTIFICIAL INTELLIGENCE (AI) PLATFORM

TECHNICAL FIELD

This disclosure pertains generally to the integration of computerized telephony, computerized video-telephony and artificial intelligence technology, and more specifically to a fully integrated voice over internet protocol (VoIP), audiovisual over internet protocol (AVoIP), and artificial intelligence (AI) platform.

BACKGROUND

An ever larger share of phone calls are made from and processed by computing devices such as smartphones and personal computers. For example, Voice over Internet Protocol (VoIP) enables the delivery of voice communication over Internet Protocol (IP) networks, such as the public internet or private IP networks, as opposed to conventional public switched telephone networks (PSTN). Processing VoIP telephone calls involves signaling, channel setup, digitization of the analog voice signals and encoding. Instead of being transmitted over a circuit switched network, the digital information is packetized, and IP packets are transmitted over a packet switched network. Contemporary providers of VoIP enable dynamic interconnection between users on any two domains on the internet, using VoIP phones, or VoIP software running on personal computers, smartphones or other devices capable of running applications and connecting to a network.

In addition to VoIP, Audiovisual over Internet Protocol (AVoIP) can be used to transmit video as well as audio content between endpoints over an IP network such as the internet. This enables functionality such as real-time video calls and conferences, using software running on personal computers, smartphones or other network enabled devices. AVoIP systems can encode audiovisual content on an endpoint to a bit stream, and transmit that bitstream encapsulated in a stream of IP packets over an IP network such as the internet. The bitstream can subsequently be decoded on a target endpoint, and played back as audiovisual content. The encoding/decoding can utilize conventional audio codecs, and the transmission can leverage Real-time Transport Protocol (RTP) or a variation thereof.

VoIP and AVoIP have many advantages over conventional PSTN telephony, including bandwidth efficiency, pricing and convenience. More generally, using computing devices to make and manage audio calls and video conferences enables the integration of many new features in this context. It is desirable to leverage opportunities provided by the application of computerized processing and analysis to digitized content of audio and video calls.

SUMMARY

An AI platform is fully integrated with existing VoIP, AVoIP and/or other telephony infrastructure. In the course of providing VoIP/AVoIP audiovisual calls, a VoIP/AVoIP media stream of audiovisual content is processed, and transferred between multiple endpoints (e.g., two or more computing devices such as desktop computers, laptop computers, smartphones, etc.). In this context, the transferred audiovisual content is processed as a series of frames. AI processing is applied to each frame of the transferred audiovisual content, in real-time while the audiovisual call is occurring. AI processing can be applied to each specific frame prior to transferring the specific frame to any target endpoint on the audiovisual call. Many examples of AI processing can be applied in this context. For example, automated speech recognition can be performed on the audiovisual content, in which the speech of the audiovisual content is converted to text, in real-time while the audiovisual call is occurring. Silent frames containing no audio can also be detected. Further, the text can be automatically punctuated, based on characteristics of sound monitored during the audiovisual call, and/or based on natural language processing of content of the text. The audiovisual call can further be automatically transcribed to a text file in real-time.

Another example of AI processing is the automatic detection of the occurrence of specific triggers during audiovisual calls. Examples of triggers include a party to an audiovisual call speaking a specific word or combination of words, and/or specific characteristics of sound such as pitch, duration, timbre, loudness, etc. Another example of AI processing is the automatic identification of an occurrence of a specific scenario during an audiovisual call. Examples of specific scenarios include sentiment of a party to the call, a facial expression made by a party to the call, a physical gesture made by a party to the call, or an occurrence of a specific event during the call, such as a sale, an articulation of an objection made by a party to the call, a discussion of a specific topic, a request for a price during of an item, an apology made by a party to the call, a resolution of an issue, etc.

Additional enhanced functionality is automatically provided as a result of applying the AI processing to each frame of the transferred audiovisual content. For example, in response to detecting the occurrence of a specific trigger, a corresponding directive can be automatically output to a party to the audiovisual call, on a screen of a calling device operated by that party, functioning as a real-time recommendation. The correspondence between triggers and directives can be instantiated at any level of granularity. The occurrence of clearance criteria associated with given output directives can also be automatically detected during audiovisual calls, such as the directed party having said specific phrases after the display of the directive, thereby having complied with the recommendation. In response to detecting the occurrence of clearance criteria, the display of the directive is automatically stopped.

The occurrence of triggers, scenarios, corresponding outputting of directives, and corresponding results of outputting of directives, can be tracked during multiple audiovisual calls. Statistics concerning such tracked data can be compiled, and provided to users such as supervisors and managers. In addition, information concerning the occurrence of triggers during a specific ongoing call, the resulting outputting of directives, and the detected results thereof can be displayed to parties to the given call (as well as other parties such as supervisors) in real-time, while the call is occurring.

Machine learning techniques can also be applied to the tracked occurrences of triggers, corresponding outputting of directives, and corresponding results. The machine learning can be used in this context to perform actions such as creating new triggers, editing existing triggers, creating new directives corresponding to specific triggers, and editing existing directives, at any level of granularity.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various example implementations for purposes of illustration only. One skilled in the art will readily recognize from the following discussion that alternative examples of the structures and methods illustrated herein may be employed without departing from the principles described herein.

DETAILED DESCRIPTION

Figure 1:
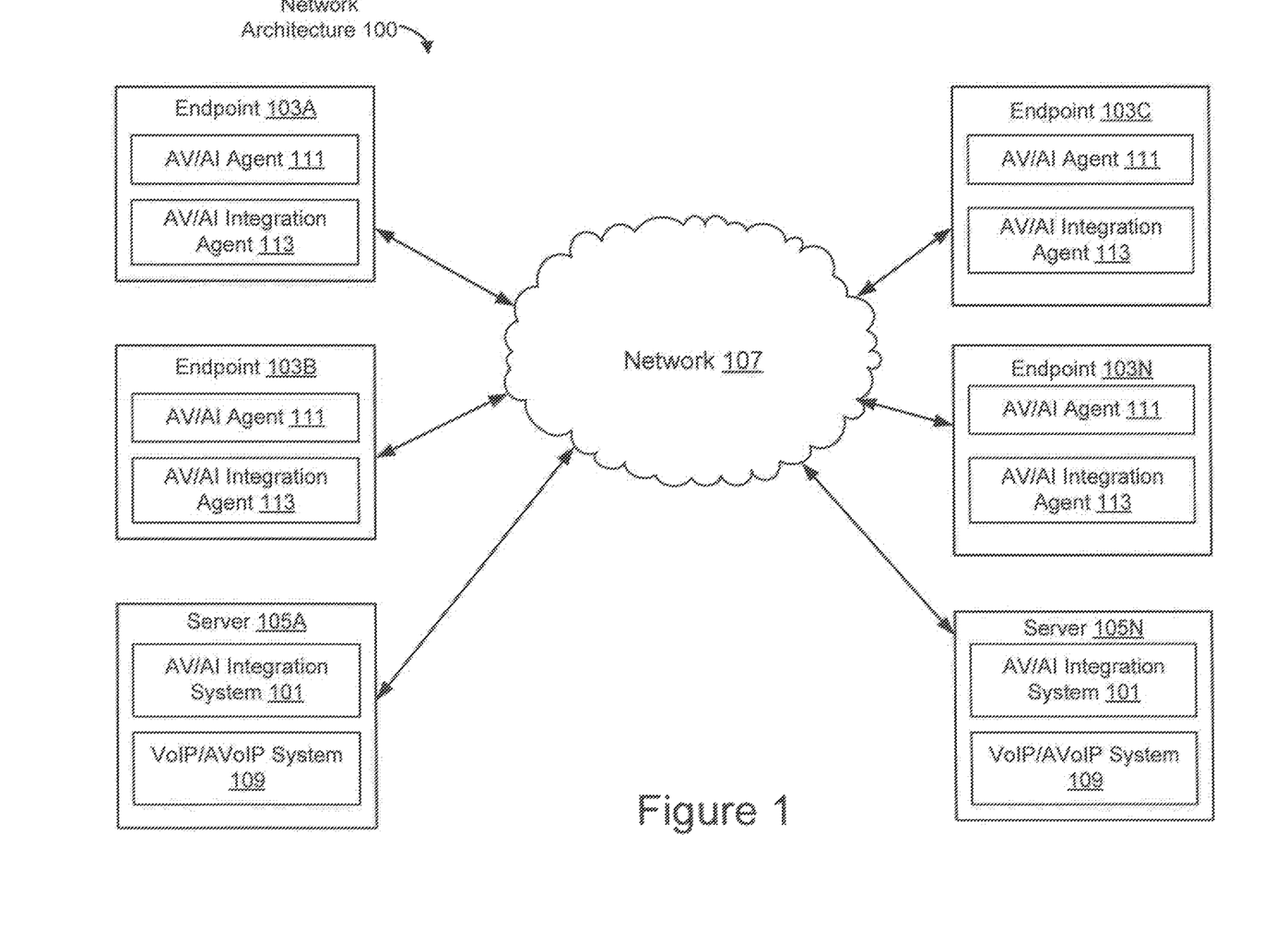
FIG. 1 is a block diagram of an exemplary network architecture in which an audiovisual (AV)/artificial intelligence (AI) integration system can be implemented.

FIG. 1 is a block diagram illustrating an exemplary network architecture 100 in which an AV/AI integration system 101 can be implemented. In the illustrated network architecture 100, endpoint systems 103A, 103B, 103C and 103N, as well as servers 105A and 105N, are communicatively coupled to a network 107. It is to be understood that in practice orders of magnitude more endpoints 103 and servers 105 can be deployed. An AV/AI integration system 101 is illustrated as residing on each server (105A and 105N), with an endpoint-side AV/AI integration agent 113 residing on each endpoint, 103A, 103B, 103C and 103N. It is to be understood that in different implementations the AV/AI integration system 101 can reside on different computers 210, or be distributed between multiple computing systems 210 in different ways as desired. Also illustrated in FIG. 1 is a VoIP/AVoIP system 109 residing on each server 105A-N, and an endpoint-side VoIP/AVoIP agent 111 residing on each endpoint 103A-N. These components are discussed in more detail below.

Many different networking technologies can be used to provide connectivity from each of endpoint computing devices 103A-N and servers 105A-N to network 107. Some examples include: WAN, LAN, and various wireless technologies (e.g., Mobile WiMAX, LTE, etc.). Endpoint systems 103A-N are able to access applications and/or data on server 105A or 105N using, for example, a web browser or other endpoint software (not shown). Endpoints 103 can be in the form of, for example, desktop computers, laptop computers, smartphones or other mobile or wearable computing devices, comprising portable computing devices capable of connecting to a network 107 and running applications. Servers 105 can be in the form of, for example, rack mounted or tower computers.

Although FIG. 1 illustrates four endpoints 103A-N and two servers 105A-N as an example, in practice many more (or fewer) computers can be deployed as noted above. In one implementation, the network 107 is in the form of the internet. Other networks 107 or network-based environments can be used in addition to or instead of the internet in other implementations.

Figure 2:
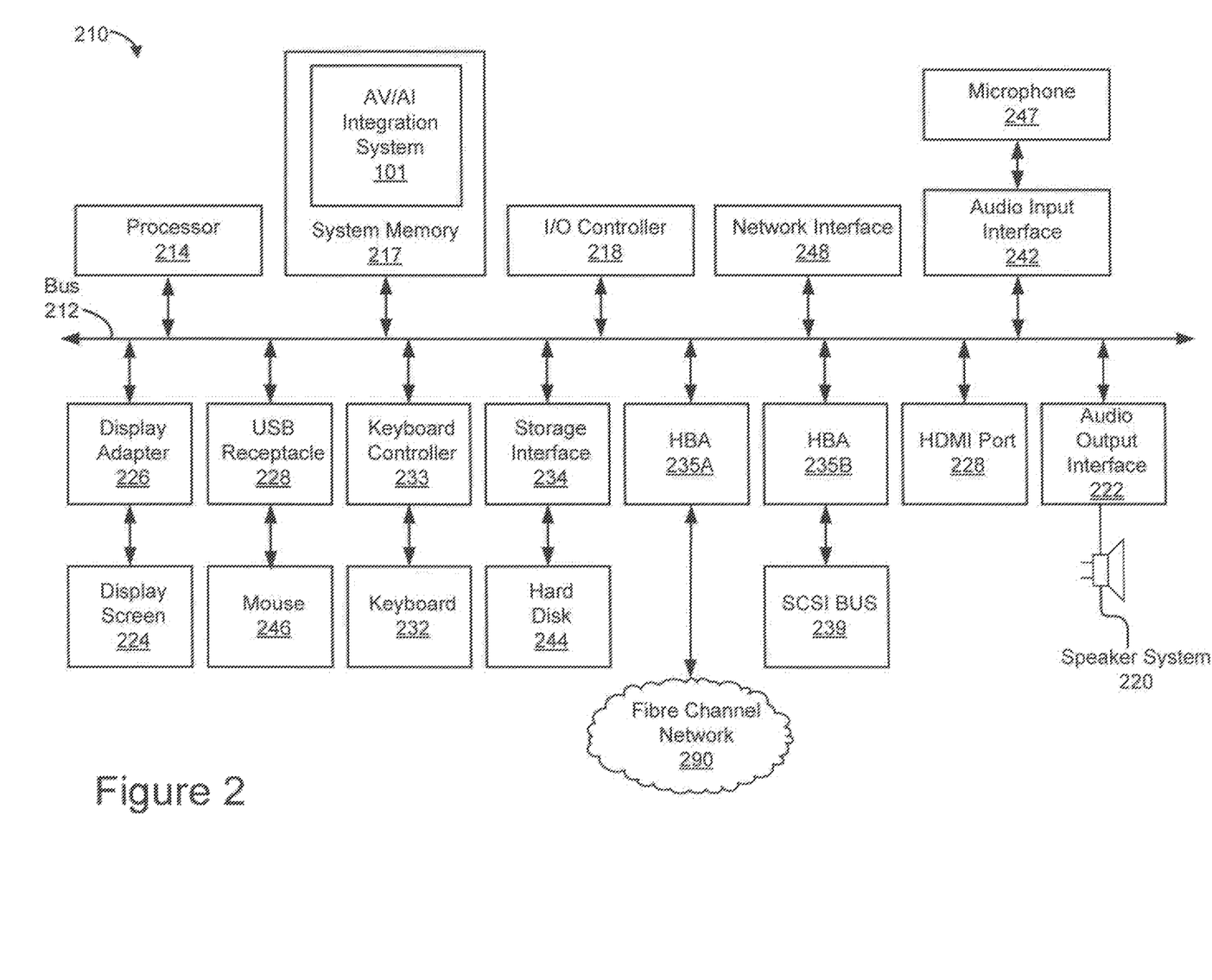
FIG. 2 is a block diagram of a computer system suitable for implementing an AV/AI integration system.

FIG. 2 is a block diagram of a computer system 210 suitable for implementing an AV/AI integration system 101. Endpoints 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), a graphics processing unit (GPU) 241, GPU memory 243, an input/output (I/O) controller 218, an audio input interface 242 communicatively coupled to an audio input device such as a microphone 247, an audio output interface 222 communicatively coupled to an audio output device such as a speaker 220, a display adapter 226 communicatively coupled to a video output device such as a display screen 224, one or more interfaces such as Universal Serial Bus (USB) ports 228, High-Definition Multimedia Interface (HDMI) ports 230, serial ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, a mouse 246 (or other pointing device) coupled to the bus 212, e.g., via a USB port 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have external keyboards 242 or external pointing devices 246, although various external components can be coupled to mobile computing devices via, e.g., USB ports 228). In different implementations the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, solid state drive, flash memory) and loaded into system memory 217 and executed by the processor 214. Application programs can also be loaded into system memory 217 from a remote location (i.e., a remotely located computer system 210), for example via the network interface 248. In FIG. 2, the AV/AI integration system 101 is illustrated as residing in system memory 217. The workings of the AV/AI integration system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as the internet. Such coupling can be wired or wireless.

Figure 3:
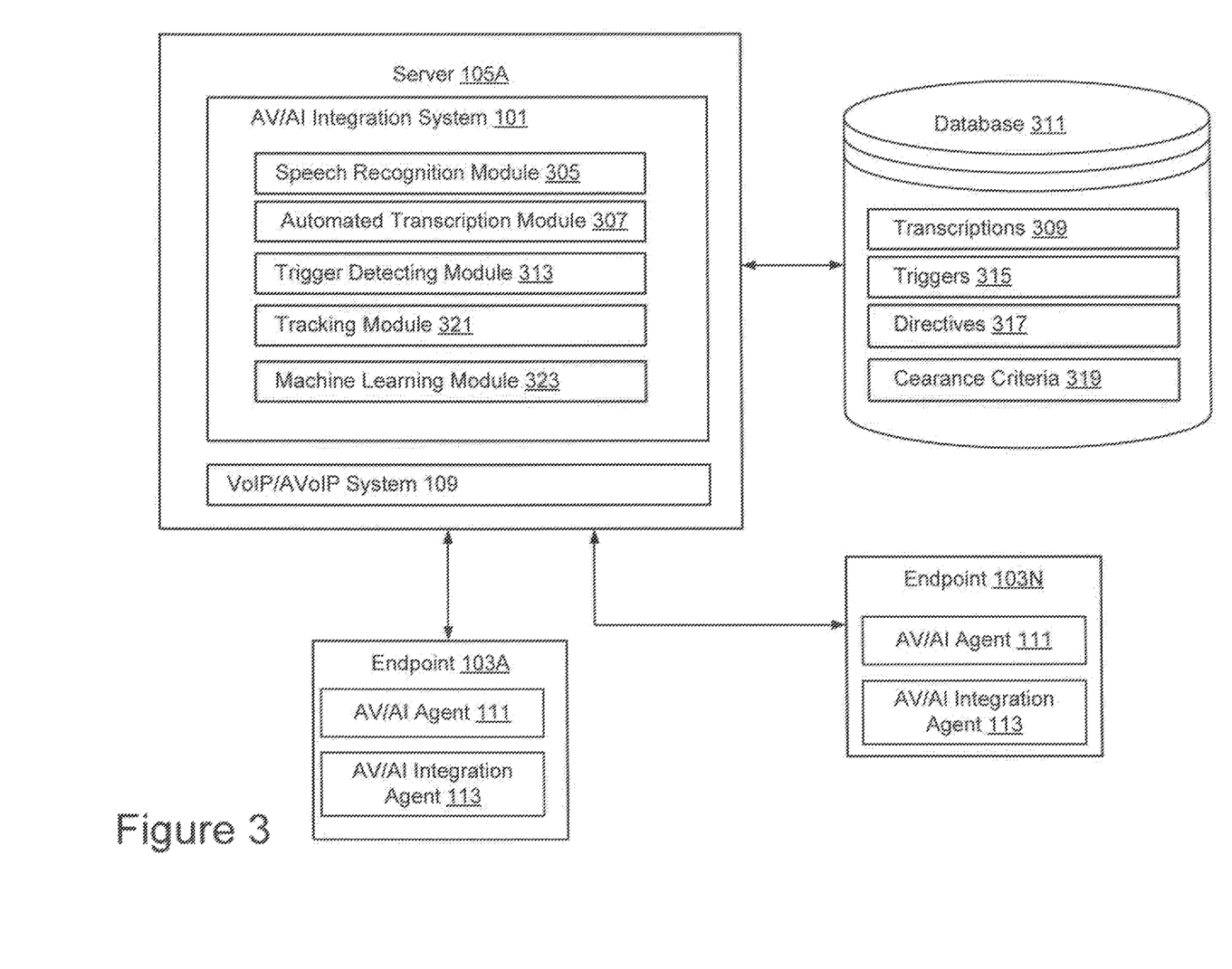
FIG. 3 is a high level block diagram of an exemplary operation of an AV/AI integration system.

FIG. 3 illustrates an AV/AI integration system 101 running on a server 105, with AV/AI integration agents 111 running on endpoints 103A and 103N. As described above, the functionalities of the AV/AI integration system 101 and/or AV/AI integration agents 111 can reside on specific computers 210 (e.g., servers 105, endpoints 103) or be otherwise distributed between multiple computer systems 210, including within a fabric/cloud-based computing environment in which the functionality of the AV/AI integration system 101 is provided as a service over a network 107. It is to be understood that although the AV/AI integration system 101 and AV/AI integration agents 111 are illustrated in FIG. 3 as single entities, the illustrated AV/AI integration system 101 and AV/AI integration agents 111 represent collections of functionalities, which can be instantiated as a single or multiple modules as desired (an instantiation of a specific, multiple module AV/AI integration system 101 is illustrated in FIG. 3). It is to be understood that the modules of the AV/AI integration system 101 can be instantiated (for example as object code or executable images) within the system memory 217 (e.g., RAM, ROM, flash memory) (and/or the GPU memory 243) of any computer system 210, such that when the processor(s) 214 (and/or the GPU 241) of the computer system 210 processes a module, the computer system 210 executes the associated functionality. In some implementations, the GPU 241 can be utilized for some or all of the processing of given modules of the AV/AI integration system 101. In different implementations, the functionality of some or all of the modules of the AV/AI integration system 101 can utilize the CPU(s) 214, the GPU 241, or any combination thereof, as well as system memory 217, GPU memory 243, or any combination thereof as desired.

As used herein, the terms "computer system," "computer," "endpoint," "endpoint computer," "server," "server computer" and "computing device" mean one or more computers configured and/or programmed to execute the described functionality. Additionally, program code to implement the functionalities of the AV/AI integration system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

The AV/AI integration system 101 fully integrates an AI platform with existing VoIP, AVoIP and/or other telephony infrastructure. In the example implementation illustrated in FIG. 3, an AV/AI integration system 101 is deployed on the same server 105 as a VoIP/AVoIP system 109. The specific functionality provided by the VoIP/AVoIP system 109 can vary between implementations, including example features such as VoIP/AVoIP endpoint 103 to endpoint 103 connectivity, audiovisual conferencing and calling between any number of endpoints 103, underlying telephony infrastructure, etc. Although FIG. 3 illustrates a single server 105, the AV/AI integration system 101 and the VoIP/AVoIP system 109 may, in practice, be deployed across multiple servers 105, including at multiple physical locations (e.g., data centers in different cities, countries, continents, etc.). Although the AV/AI integration system 101 and the VoIP/AVoIP system 109 are illustrated in FIG. 3 as separate entities, in some implementations the AV/AI integration system 101 may be instantiated as a component of the VoIP/AVoIP system 109, or share varying degrees of functionality with the VoIP/AVoIP system 109 as desired.

FIG. 3 illustrates both endpoint-side AV/AI integration agents 113 and endpoint-side VoIP/AVoIP agents 111 running on the endpoints 103A-N. Endpoint-side VoIP/AVoIP agents 111 can provide endpoint-side VoIP/AVoIP and general telephony functionality, such as user interfaces for participating in audiovisual calls, on endpoint-level computing devices 103 such as desktops, laptops, smartphones, etc. An endpoint-side AV/AI integration agent 113 may be instantiated as a component of an endpoint-side VoIP/AVoIP agent 111, or may share various functionality therewith, in different implementations.

In the course of providing VoIP/AVoIP services to multiple endpoints 103, the VoIP/AVoIP system 109 processes a VoIP/AVoIP media stream of audiovisual content (audio for voice calls, audio and video for video conferences, etc.). For clarity of expression and to avoid excessive redundancy of language, as the term is used herein, "audiovisual content" means either audio plus video, audio only, or video only. Likewise, the term "audiovisual call" is used herein to mean a voice call (e.g., a VoIP call) or a video call (e.g., with a video component as well, such as an AVoIP call including both audio and video). An audiovisual call can be between two endpoints 103 or more than two endpoints 103 (e.g., a multiparty conference call) as desired.

As the VoIP/AVoIP system 109 process audiovisual content (for example, while transferring audiovisual content between multiple endpoints 103 during an audio audiovisual call), the AV/AI integration system 101 can process the audiovisual content as a series of frames, and apply AI processing to each frame of the transferred audiovisual content, in real-time while the audiovisual call is occurring. This enables the AV/AI integration system 101 to apply AI processing to each specific, individual frame of audiovisual content being transferred between endpoints 103, prior to transferring each specific frame to one or more target endpoint(s) 103 on the audiovisual call. By applying AI processing to audiovisual content at a frame level in full integration with an existing telephony infrastructure, a wide variety of enhanced AI functionality can be automatically provided in conjunction with or as an extension of the audiovisual calls, as described in detail below.

In one example of applying AI processing to frames of audiovisual content, a speech recognition module 305 of the AV/AI integration system 101 automatically performs speech recognition on the audio component of the audiovisual content, in real-time while the audiovisual call is occurring (e.g., automatically converting speech of the call to text in real-time). Computerized speech recognition (sometimes known as automatic speech recognition or speech to text) enables the recognition of spoken language, and its automatic conversion into text by computers. Further, the speech recognition module 305 can automatically punctuate text based on natural language processing of the content of the text, and/or sound characteristics of the audio, such as raising pitch indicative of a question mark, pauses indicative of commas, etc. In addition, sound characteristics such as pitch, duration, timbre, intonation, loudness, etc., can be automatically monitored during audiovisual calls. Silent frames (i.e., frames containing no audio) may also be detected in audiovisual content. Sounds characteristics and/ or silent frames may be used to aid speech recognition, punctuation, transcription, and other functionalities as desired.

The automatic recognition of speech in real-time while an audiovisual call is occurring can be used to automatically provide various AI-based enhanced features. For example, in one implementation, an automated transcription module 307 of the AV/AI integration system 101 automatically transcribes audiovisual calls to text files, in real-time while audiovisual calls are occurring. These transcriptions 309 can be provided to various parties (e.g., managers, supervisors, analysts) as they are being created, for example for real-time management of sales calls, customer service calls, technical support calls, etc. These transcriptions 309 can also be stored (e.g., in a database 311 or other suitable storage mechanism), for subsequent analysis and/or provision to various parties as desired.

As another example of AI functionality, in some implementations a trigger detecting module 313 of the AV/AI integration system 101 automatically detects the occurrence of specific triggers 315 during audiovisual calls, in real-time as the calls are occurring. In response to detecting a given trigger 315, a corresponding directive 317 can be displayed to one or more parties to the audiovisual call, as described in more detail below. Triggers 315 can pertain to various elements of audiovisual calls in different implementations, including elements such as spoken keywords or phrases, occurrences of specific events during calls, numbers of questions asked, given filler words, interruptions, speech speed, tone, energy, mood, facial expressions of parties to calls, hand gestures, etc.

In different implementations triggers 315 can be defined based on various factors and combinations of factors at any level of granularity, such as a specific party to an audiovisual call speaking a specific word or a specific combination of words, optionally in combination with a specific sound characteristic, such as pitch or change thereto, duration of one or more words, pauses, timbre, loudness including increasing or decreasing volume of speech, etc. The process of determining that a trigger 315 has occurred can also take into account context of the audiovisual call, such as the type of the call (e.g., sales call, tech support call, customer service call, etc.), purpose of the call, identity or role of one or more of the parties to the call, location of one or more of the parties to the call, the identity of or other factors concerning the organization(s) with which one or more of the parties are affiliated, the time of day during which the call is occurring, the length of the call, etc.

In response to detecting the occurrence of a specific trigger 315, the end-point side AV/AI integration agent 113 on a given endpoint 103 can automatically output a specific corresponding directive 317 to a party to the audiovisual call, on a display screen 224 of the calling device being operated by the party, in real-time as the call is occurring. The displayed directive 317 corresponds to the occurrence of the specific trigger 315 during the call. This can take the form of automatically popping-up suggestions to callers based on the occurrence of a defined trigger. Such directives 317 can be, for example in the form of information displayed on the screen, optionally including rich text, links, etc.

Directives 317 can be displayed to one or more parties to an audiovisual call while the call is occurring, thus taking the form of real-time recommendations. The scope of directives 317 can be based on properties such as name, team, role, or other key identifiers of callers from within a given organization, as well as properties of other parties such as customer name, organization size, location, or other available information. The content of directives 317 are variable design choices, but can be in the form of instructions to a caller, for example providing a script for responding to a given objection raised by a potential customer during a sales call. In various implementations directives 317 can include text, graphics, links, etc. Directives 317 can be associated with triggers 315 at any desired level of granularity. Triggers 315 and corresponding directives can be stored, for example in the database 311.

Clearance criteria 319 can be defined and otherwise determined, indicating when a caller has finished complying with or otherwise processing a displayed directive 317. The occurrence of such clearance criteria 319 are associated with given directives 317, and can be stored in the database 311. The occurrence of clearance criteria 319 during audiovisual calls can be automatically detected by the AV/AI integration system 101. In response to detecting the occurrence of a specific clearance criterion 319, the AV/AI integration system 101 automatically ceases to output the associated directive 317. For example, clearance criteria 319 associated with a specific directive 317 can be in the form of the directed party having said specific phrases after the display of the directive 317, thereby having complied with the recommendation. In response to detecting the occurrence of clearance criteria 319, the display of the directive 317 is automatically stopped, and the directive 317 can be classified as having been completed.

The AV/AI integration system 101 can also detect the results of displayed directives 317, i.e., what is said next (e.g., by the other party to the call) after a directive 317 is completed. By automatically detecting results of outputting specific directives 317 to specific parties in response to specific triggers 315, the effectiveness of different directives 317 can be tracked over time as described in detail below, and the directives 317 can be redeployed, edited, tweaked, discontinued, etc., as desired.

As with triggers 315 and clearance criteria 317, the AV/AI integration system 101 can automatically identify the occurrence of specific scenarios during audiovisual calls, such as a facial expression made by a party to the call, a physical gesture made by a party to the call, an occurrence of a specific event such as a sale during the call, an articulation of an objection made by a party to the call, a discussion of a specific topic during the call, a request for a price of an item during the call, an apology made by a party to the call, or a resolution of an issue during the call. Other examples of identified scenarios may include automatically detecting a sentiment of a party to the call by tone or other quality of voice, facial expressions, words used and/or hand gestures made, etc. Examples of sentiment include anger, confusion, frustration, acceptance, etc. Metrics can also be identified, such as given events occurring for specific lengths of time, multiple times, in given combinations, etc. As with detected triggers, corresponding directives 317 can be output in response to the identification of specific scenarios during audiovisual calls. Additional actions can also be taken in response to identifying the occurrence of such scenarios during calls, in addition to or instead of outputting directives 317.

A tracking module 321 of the AV/AI integration system 101 can track the occurrences of triggers and/or other scenarios, the corresponding directives output and/or other actions taken, and detected results of these activities over the course of multiple audiovisual calls. Statistics concerning this tracked information can be compiled at any level of granularity. Such statistics as well as the underlying tracked data may be stored in the database 311. Compiled statistics and other information concerning this tracked data can be provided to users such as supervisors and managers. For example, this enables supervisors to know which directives are triggered over time, and how the real-time display of these directives affects call outcomes. Supervisors can thus act on this information to highlight results with their teams, learn which recommendations are and are not effective, etc. As noted, this tracking can be performed and reported at varying levels of granularity as desired, such as which triggers 315 occur most frequently during given types of calls, which real-time directives 317 are displayed most frequently over given time intervals, improvements in call outcomes with real-time directive usage, real-time directive analytics, clearance of real-time directives (manual and automatic), creation and sharing of real-time directives over time, etc.

Results and tracked information can also be input into a machine learning module 323 of the AV/AI integration system 101. The machine learning module 323 can apply machine learning techniques to the tracked occurrences of triggers 315 and/or other scenarios, corresponding outputting of directives 317 and/or other actions taken, and corresponding results. The machine learning can be used in this context to perform actions such as creating new triggers 315, editing existing triggers 315, creating new directives 317 corresponding to specific triggers 315, and editing existing directives 317, at any level of granularity.

As described above, the database 311 may store transcriptions 309 of audiovisual calls, tracked data concerning the occurrence of various identified triggers and other scenarios that occurred during calls, corresponding output directives 317 and/or other actions taken, corresponding results, and compiled statistics concerning this data over time. With direct access to the information stored in the database 311, the AV/AI integration system 101 can create and utilize other additional functionalities, not only during calls but afterwards as well, such as real-time and post-call access to video frames to detect sentiment, emotion, lip-reading, gesture detection, laughter, smiling, distraction, etc. Real-time and post-call analysis of voice activity also enables additional functionality, such as voice and other sound analysis at any level of granularity.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory, and the mechanisms that implement the invention or its features may have different names, divisions and/or formats. The foregoing description, for purpose of explanation, has been described with reference to specific examples. However, the illustrative discussions above are not intended to be exhaustive or limiting to the precise forms disclosed. Many modifications and variations are possible in view of the above teachings. The examples were chosen and described in order to best explain relevant principles and their practical applications, to thereby enable others skilled in the art to best utilize various examples with or without various modifications as may be suited to the particular use contemplated.

What is claimed is:

1. A computer implemented method, comprising:
transferring audiovisual content between multiple endpoints, the transferred audiovisual content comprising an audiovisual call;
processing the transferred audiovisual content as a series of frames;
applying artificial intelligence (AI) processing to each frame of the transferred audiovisual content, in real-time while the audiovisual call is occurring including automatically identifying an occurrence of a specific scenario during the audiovisual audiovisual call from a group of specific scenarios consisting of: a sentiment of a party to the audiovisual call, a facial expression made by a party to the audiovisual call, a physical gesture made by a party to the audiovisual call, an occurrence of a specific event during the audiovisual call, an occurrence of a sale during the audiovisual call, an articulation of an objection made by a party to the audiovisual call, a discussion of a specific topic during the audiovisual call, a request for a price of an item during the audiovisual call, an apology made by a party to the audiovisual call, and a resolution of an issue during the audiovisual call; and
automatically providing at least one enhanced functionality as a result of applying the AI processing to each frame of the transferred audiovisual content.

2. The method of claim 1, wherein the audiovisual call further comprises:
a voice over internet protocol (VoIP) call.

3. The method of claim 1, wherein the audiovisual call further comprises:
an audiovisual over internet protocol (AVoIP) call.

4. The method of claim 1 wherein, the audiovisual call further comprises:
a conference call between more than two endpoints.

5. The method of claim 1, wherein the applying AI processing to each frame of the transferred audiovisual content, in real-time while the audiovisual call is occurring further comprises:
performing automated speech recognition on the audiovisual content, in real-time while the audiovisual call is occurring.

6. The method of claim 5, wherein the performing automated speech recognition on the audiovisual content, in real-time while the audiovisual call is occurring further comprises:
converting speech of the audiovisual content to text, in real-time while the audiovisual call is occurring.

7. The method of claim 6, wherein the converting speech of the audiovisual content to text, in real-time while the audiovisual call is occurring further comprises:
punctuating the text based on characteristics of sound monitored during the audiovisual call, and/or based on natural language processing of content of the text, in real-time while the audiovisual call is occurring.

8. The method of claim 6, wherein the automatically providing at least one enhanced functionality as a result of applying the AI processing to each frame of the transferred audiovisual content further comprises:
automatically transcribing the audiovisual call to a text file, in real-time while the audiovisual call is occurring.

9. The method of claim 1, wherein the applying AI processing to each frame of the transferred audiovisual content, in real-time while the audiovisual call is occurring further comprises:
applying AI processing to a specific frame of the transferred audiovisual content prior to transferring the specific frame to any target endpoint on the audiovisual call.

10. The method of claim 1, wherein the applying AI processing to each frame of the transferred audiovisual content, in real-time while the audiovisual call is occurring further comprises:
detecting silent frames in the transferred audiovisual, a silent frame comprising a frame containing no audio.

11. The method of claim 1, wherein the applying AI processing to each frame of the transferred audiovisual content, in real-time while the audiovisual call is occurring further comprises:
automatically detecting an occurrence of a specific trigger during the audiovisual call.

12. The method of claim 11, wherein the automatically providing at least one enhanced functionality as a result of applying the AI processing to each frame of the transferred audiovisual content further comprises:

in response to detecting the occurrence of the specific trigger, automatically outputting a directive to a party to the audiovisual call, on a screen of a calling device operated by the party to the call, the output directive corresponding to the occurrence of the specific trigger.

13. The method of claim 12, further comprising:

tracking occurrence of the triggers, corresponding outputting of directives, and corresponding results of outputting of directives, during multiple audiovisual calls.

14. The method of claim 13, further comprising:

compiling statistics concerning the occurrences of triggers, the corresponding outputting of directives, and the corresponding results of outputting of directives tracked during multiple audiovisual calls.

15. The method of claim 13, further comprising:

applying machine learning techniques to the tracked occurrences of triggers, the corresponding outputting of directives, and the corresponding results; and in response to results of applying the machine learning techniques, performing at least one of the following actions: creating a new trigger, editing an existing trigger, editing an existing directive corresponding to at least one trigger, and creating a new directive corresponding to at least one trigger.

16. The method of claim 12, further comprising:

automatically detecting an occurrence of clearance criteria during the audiovisual call, the detected clearance criteria being associated with the output directive; and in response to detecting the occurrence of the clearance criteria, automatically ceasing to output the associated directive.

17. The method of claim 1, wherein the automatically providing at least one enhanced functionality as a result of applying the AI processing to each frame of the transferred audiovisual content further comprises:

automatically taking at least one additional action in response to identifying the occurrence of the specific scenario during the audiovisual call.

18. A computer system comprising:

at least one processor;

computer memory;

a transferring component residing in the computer memory configured to transfer audiovisual content between multiple endpoints, the transferred audiovisual content comprising an audiovisual call;

a processing component residing in the computer memory configured to process the transferred audiovisual content as a series of frames;

an artificial intelligence (AI) applying component residing in the computer memory configured to apply AI processing to each frame of the transferred audiovisual content, in real-time while the audiovisual call is occurring including automatically identifying an occurrence of a specific scenario during the audiovisual call from a group of specific scenarios consisting of: a sentiment of a party to the audiovisual call, a facial expression made by a party to the audiovisual call, a physical gesture made by a party to the audiovisual call, an occurrence of a specific event during the audiovisual call, an occurrence of a sale during the audiovisual call, an articulation of an objection made by a party to the audiovisual call, a discussion of a specific topic during the audiovisual call, a request for a price of an item during the audiovisual call, an apology made by a party to the audiovisual call, and a resolution of an issue during the audiovisual call; and an enhanced functionality providing component residing in the computer memory configured to automatically provide at least one enhanced functionality as a result of applying the AI processing to each frame of the transferred audiovisual content.

19. A computer implemented method, comprising:

transferring audiovisual content between multiple endpoints, the transferred audiovisual content comprising an audiovisual call;

processing the transferred audiovisual content as a series of frames;

applying artificial intelligence (AI) processing to each frame of the transferred audiovisual content, in real-time while the audiovisual call is occurring including automatically identifying an occurrence of a specific scenario during the audiovisual call from a group of specific scenarios consisting of: a sentiment of a party to the audiovisual call, a facial expression made by a party to the audiovisual call, a physical gesture made by a party to the audiovisual call, an occurrence of a specific event during the audiovisual call, an occurrence of a sale during the audiovisual call, an articulation of an objection made by a party to the audiovisual call, a discussion of a specific topic during the audiovisual call, a request for a price of an item during the audiovisual call, an apology made by a party to the audiovisual call, and a resolution of an issue during the audiovisual call; and automatically providing at least one enhanced functionality as a result of applying the AI processing to each frame of the transferred audiovisual content including automatically taking at least one additional action in response to identifying the occurrence of the specific scenario during the audiovisual call.

* * * * *